United States Patent [19]

Imai

[11] Patent Number: 4,843,475

[45] Date of Patent: Jun. 27, 1989

[54] IMAGE PICKUP DEVICE

[75] Inventor: Kunio Imai, Hachioji, Japan

[73] Assignee: Canon Kabushiki Kaisha, Tokyo, Japan

[21] Appl. No.: 279,247

[22] Filed: Dec. 1, 1988

Related U.S. Application Data

[63] Continuation of Ser. No. 821,354, Mar. 3, 1987, abandoned.

[30] Foreign Application Priority Data

Mar. 11, 1986 [JP] Japan .................................. 61-51502

[51] Int. Cl.4 .............................................. H04N 5/30
[52] U.S. Cl. .................................. 358/225; 358/180; 354/106; 354/222
[58] Field of Search ................ 358/180, 225; 354/106, 354/222

[56] References Cited

U.S. PATENT DOCUMENTS

| | | | |
|---|---|---|---|
| 3,705,328 | 12/1972 | Torok | 358/180 |
| 3,935,381 | 1/1976 | Petrocelli et al. | 358/180 |
| 4,002,824 | 1/1977 | Petrocelli et al. | 358/180 |
| 4,231,066 | 10/1980 | Merchant | 358/225 |
| 4,583,831 | 4/1986 | Harvey | 354/106 |
| 4,589,029 | 5/1986 | Torimaru et al. | 358/180 |

Primary Examiner—Russell E. Adams
Attorney, Agent, or Firm—Fitzpatrick, Cella, Harper & Scinto

[57] ABSTRACT

An image pickup apparatus including an image pickup device for picking up the image of a subject, a zoom lens of changing a magnification for the image entering the image pickup device, and a scan range changing circuit for changing the scan range of the image pickup device. It enlarges and reduces the image signal by a combination of a variable magnification of the zoom lens and a variable scan range of the image pickup device.

37 Claims, 6 Drawing Sheets

IMAGE PICKUP DEVICE

This application is a continuation of application Ser. No. 021,354 Mar. 3, 1987.

BACKGROUND OF THE INVENTION

1. Field of the Invention

The present invention relates to an image pickup apparatus and more particularly to an image pickup apparatus which has a function to continuously change the angle of view of a subject from the telephoto to wide angle end.

2. Related Background Art

Conventionally, a zoom lens is known which uses an optical means for continuously changing the angle of view of a subject to be picked up photoelectrically.

As the zoom magnification of a zoom lens increases, the capability to convey an image is improved, so that it is desired to increase the zoom magnification.

On the other hand, image pickup devices, including, for example, a video camera, are preferably small and light in order to increase its portability.

However, as the zoom magnification increases, the zoom lens increases in size and weight and the structure of the optical system becomes complicated. Thus to increase the capability to convey an image by increasing the zoom magnification has made it difficult to miniaturize and lighten the video camera.

SUMMARY OF THE INVENTION

It is an object of the present invention to provide an image pickup apparatus which eliminates drawbacks of the prior art such as mentioned above, is small-sized, light, and improves the capability to convey an image by increasing the zoom magnification.

In order to achieve this object, an image pickup apparatus according to the present invention includes image pickup means for picking up the image of a subject, a zoom lens for changing a magnification of the subject image entering the image pickup means, and scan range changing means for changing the scan range of the image pickup means. A wide range of zoom magnifications corresponding to the product of a changing zoom magnification of the optical zoom lens and a ratio of changes in the scan range of the image pickup means is obtained by a combination of the zoom lens and the scan range changing means. Thus the image pickup apparatus according to the present invention provides a large zoom magnification, and is small-sized and light compared to a conventional image pickup apparatus in which only an optical zoom lens sets its zoom magnification.

Other objects and features of the invention will be apparent from the following description and drawings.

DETAILED DESCRIPTION OF THE PREFERRED EMBODIMENT

Embodiments of the present invention will now be described in more detail with reference to the drawings.

Figure 1:
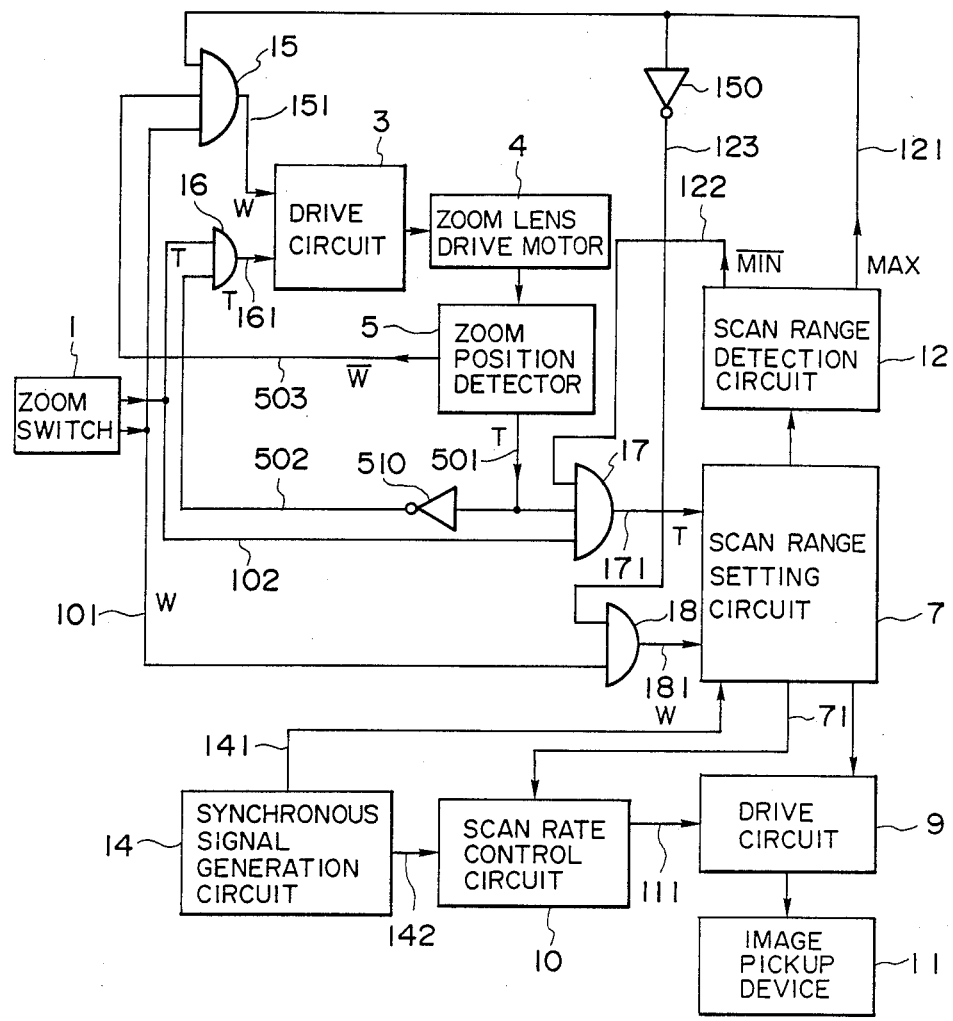
FIG. 1 is a block diagram showing the structure of a first embodiment of the present invention.

FIG. 1 is a block diagram showing the structure of a first embodiment of the present invention.

In FIG. 1, reference numeral 1 denotes a zoom switch which selects between a telephoto and a wide angle view of the subject.

Reference numeral 4 denotes a zoom lens and a zoom lens drive motor which drives a zoom lens. Reference numeral 3 denotes a drive circuit which drives the zoom lens toward the telephoto end or the wide angle end. Reference numeral 5 denotes a zoom position detector which produces a detection signal when zoom lens 4 reaches the telephoto end or the wide angle end. Reference numeral 11 denotes an image pickup device. Reference numeral 7 denotes a scan range setting circuit which sets a range of scans of image pickup device 11.

Reference numeral 9 denotes a drive circuit which causes image pickup device 11 to scan a scan range set by a scan range setting cirucit 7. Reference numeral 10 denotes a scan rate control circuit which receives a signal 71 indicative of a scan range from scan range setting circuit 7 and controls drive circuit 9 so that horizontal and vertical scanning synchronizations are maintained constant although the scan range changes. Image pickup device 11 performs an photoelectric conversion of light from a subject via zoom lens 4 and produces an image signal when scanned by drive circuit 9. Reference numeral 12 denotes a scan range detection circuit which receives information from scan range setting circuit 7 and outputs a signal 121 indicating that the scan range of image pickup device 11 is maximum when it is so and a signal 122 indicating that the scan range is not minimum except when the scan range is minimum.

Reference numeral 14 denotes a synchronous signal generation circuit which generates synchronous signals 141 and 142 necessary for horizontal and vertical scanning of image pickup device 11 and delivers them to scan range setting circuit 7 and a scan rate control circuit 10, respectively.

Reference numeral 15 denotes an AND gate which produces an output signal 151 to drive circuit 3 when it receives all of (1) a signal 101 from zoom switch 1 indicating that the wide angle side is selected, (2) a signal 503 from zoom position detector 5 that indicated that the position of zoom lens 4 is not on the wide angle side, and (3) a signal 121 from scan range detection circuit 12 that indicates that the scan range of image pickup device 11 is at the maximum. Drive circuit 3 drives zoom lens drive motor 4 to drive a zoom lens toward the wide angle end when it receives an output signal 151 from AND gate 15.

Reference numeral 16 denotes an AND gate which produces an output signal 161 to drive circuit 3 when it receives both of a signal 102 from zoom switch 1 indicating that the telephotoside is selected, and a signal 502 obtained via an inverter 510 when a signal 501 from zoom position detector 5 indicating that the zoom lens is at the telephoto end is off (namely, AND gate 16 receives signal 502 when the zoom lens 4 is not at the telephoto end). Drive circuit 3 drives zoom lens drive motor 4 to drive a zoom lens toward the telephoto end when it receives an output signal 161 from AND gate 16.

Reference numeral 17 denotes an AND gate which produces an output signal 171 to scan range setting circuit 7 when it receives all of signal 102 from zoom switch 1 indicating that the telephoto side is selected, signal 501 from zoom position detector 5 indicating that zoom lens 4 is at the telephoto end, and a signal 122 from scan range detection circuit 12 indicating that the scan range of image pickup device 11 is not minimum.

Scan range setting circuit 7 outputs to drive circuit 9 a control signal which reduces the scan range of image pickup device 11 when it receives output signal 171 from AND gate 17. Namely, it acts so as to achieve a telephoto effect electronically.

Reference numeral 18 denotes an AND gate which produces an output signal 181 to scan range setting circuit 7 when it receives both of a signal 101 from zoom switch 1 indicating that the wide angle side is selected, and a signal 123 obtained via an inverter 150 and comprising an inverse of a signal 21 from scan range detector 12 when signal 121 indicating that the scan range of image pickup device 11 is maximum is off (signal 123 is input to AND gate 18 when the scan range is not maximum).

Scan range setting circuit 7 outputs to drive circuit 9 a control signal which enlarges the scan range of image pickup device 11 when it receives an output signal 181 from AND gate 18. Namely, it acts so as schieve a wide angle effect electronically.

The image pickup apparatus according to the present invention is constructed as just described above and operates in the following manner.

When the telephoto side of zoom switch 1 is switched on, signal 102 from zoom switch 1 indicating that the telephoto side is selected is input to AND gates 16 and 17. When zoom lens 4 is not at the telephoto end, a signal 502 from zoom position detector 5 is input to AND gate 16, so that drive circuit 3 drives zoom lens drive motor 4 to drive a zoom lens toward the telephoto end.

At this time, since signal 501 is not input to AND gate 17, the scan range of scan range setting circuit 7 does not change (at this time, the scan range is maximum). Thus the zoom operation toward the telephoto end is performed only by the action of zoom lens 4.

When zoom lens 4 reaches the telephoto end, signal 501 is output to switch off the output signal 161 from AND gate 16. Thus the driving of zoom lens 4 toward the telephoto end is stopped. If the telephoto side of zoom lens 1 is selected, a signal 122 indicating that the scan range is not minimum is input to AND gate 17, so that an output signal 172 from AND gate 17 causes scan range setting circuit 7 to start to reduce the scan range of image pickup device 11. Since the scan range of image pickup device 11 is reduced with zoom lens 4 being stopped at the telephoto end, the zoom operation toward the telephoto end further continues electronically. When the scan range becomes minimum, the signal 122 from scan range detection circuit 12 is switched off to switch off the output signal 171 from AND gate 17, thereby stopping reduction of the scan range determined by scan range setting circuit 7. Namely, the electronic zoom operation stops.

It is to be noted that the output signal 171 from AND gate 17 can also be switched off by switching off zoom switch 1, so that the reduction of the scan range of scan range setting circuit 7 stops.

When the wide angle side of zoom switch 1 is switched on, signal 101 indicating that the wide angle side is selected is input to AND gates 15 and 18. If the scan range of image pickup device 11 is not maximum, the signal 121 from scan range detection circuit 12 is off. Thus the output signal 151 from AND gate 15 is off, so that drive circuit 3 does not operate, and zoom lens 4 does not operate either. On the other hand, since the output signal 121 is off, the output signal 181 from AND gate 18 is input to scan range setting circuit 7 to control drive circuit 9 so as to enlarge the scan range of image pickup device 11. The electronic zoom operation toward the wide angle end is thereby started, before zoom lens 4 operates. So long as zoom switch 1 is not moved away from the wide angle side, the scan range is enlarged until the scan range of image pickup device 11 becomes maximum.

When the scan range of image pickup device 11 becomes maximum, scan range detector 12 produces signal 121 and the output signal 181 from AND gate 18 is switched off.

When the wide angle side of zoom switch 1 is switched on, a signal 503 from zoom position detector 5 indicating that the zoom lens 4 is not at the wide angle end, and signals 121 and 101 are input to AND gate 15 which then produces output signal 151 to drive circuit 3 to drive zoom lens 4 toward the wide angle end. When zoom lens 4 reaches the wide angle end, the signal 503 from zoom position detector 5 is switched off and the output signal 151 from AND gate 15 is switched off to stop the zoom operation of zoom lens 4 toward the wide angle end. Also, when zoom switch 1 is moved away from the wide angle side, the zoom operation of zoom lens 4 toward the wide angle end is stopped.

Scan range setting circuit 7 may comprise, for example, an up-down counter. For example, when scan range setting circuit 7 receives output signal 181 from AND gate 18, it increments its numerical value each time circuit 7 receives a clock pulse from synchronous signal generation circuit 14 to enlarge the scan range of image pickup device 11. The value shows the starting point of the scan range of image pickup device 11. The horizontal and vertical scan starting points are set so as to change with the aspect ratio of an image pickup surface (monitor face) being maintained constant.

Scan rate control circuit 10 controls the scan rate across the image pickup surface so that the horizontal and vertical scan periods are maintained constant although the scan range is changed. It may include a phase-locked loop, for example, when a pickup tube is used as image pickup device 11, the amplitude of a saw tooth signal may be used and controlled. Scan rate control circuit 10 receives a synchronous signal 142 from synchronous signal generation circuit 14 and a signal 71 indicative of the scan range from scan range setting circuit 7 and outputs to drive circuit 9 a scan rate signal 111 (in the case of a pickup tube, a saw tooth wave).

Figure 2:
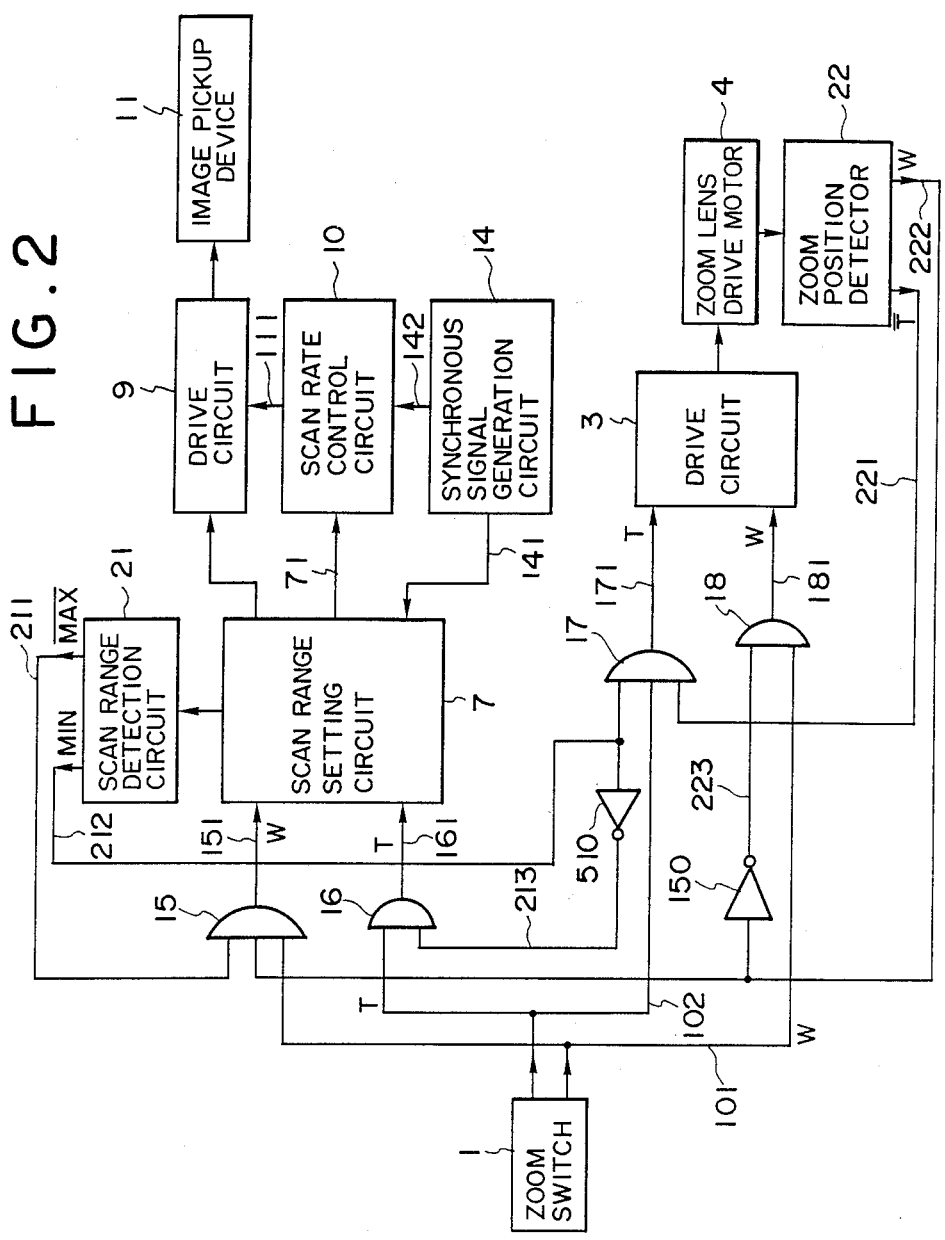
FIG. 2 is a block diagram showing the structure of a second embodiment of the present invention.

In the above embodiment, the zoom lens is changed from the wide angle side toward the telephoto end and subsequently the scan range of the image pickup device is changed from the wide angle side toward the telephoto end to perform electronic zoom while a return from the telephoto side to the wide angle end is performed by the reverse operation. In contrast, FIG. 2 shows a second embodiment in which the scan range of the image pickup device and then the zoom lens are moved from the wide angle side toward the telephoto end while when a return is made from the telephoto side toward the wide angle end, the zoom lens and then the scan range are operated.

In the same Figure, the structural parts similar to those of the first embodiment shown in FIG. 1 are described using similiar numerals to those in FIG. 1.

Scan ranges detection circuit 21 which detects the scan range of image pickup device 11 outputs a signal 212 indicating that the image pickup range is minimum and a signal 211 indicating that the scan range is not maximum (except when the scan range is maximum).

The zoom position detector 22 which detects a signal from zoom lens 4 outputs a signal 222 when the zoom lens 4 is at the wide angle end and outputs a signal 221 when zoom lens 4 is not at the telephoto end.

AND gate 15 produces an output signal 151 when it receives all of signal 101 from zoom switch 1 indicating that the wide angle side is selected, signal 211 from scan range detection circuit 21 indicating that the scan range of the image pickup device is not maximum, and signal 222 from zoom position detector 22 indicating that zoom lens 4 is at the wide angle end. Scan range setting circuit 7 enlarges the scan range, namely, changes same toward the wide angle end when it receives signal 151.

AND gate 16 produces an output signal 161 when it receives both of signal 102 from zoom switch 1 that the telephoto side is selected, and a signal 213 obtained from inverter 510 and comprising an inverse of signal 212 from scan range detection circuit 21 indicating that the scan range is minimum (namely, at the telephoto end); namely, a signal showing that the scan range is not minimum. Scan range setting circuit 7 reduces the scan range or changes same toward the telephoto end when it receives signal 161.

AND gate 17 produces a signal 171 when it receives all of signal 102 from zoom switch 1 indicating that the telephoto side is selected, signal 212 from scan range detection circuit 21 indicating that the scan range is minimum or at the telephone end, and signal 221 from zoom position detector 22 indicating that zoom lens 4 is not at the telephoto end. Drive circuit 3 drives zoom lens drive motor 4 to drive a zoom lens toward the telephoto end, when it receives signal 171.

AND gate 18 produces an output signal 181 when it receives both of signal 101 zoom switch 1 indicating that the wide angle side is selected, and a signal 223 obtained from inverter 150 and comprising an inverse of signal 222 from zoom position detector 22 indicating that zoom lens 4 is at the angle end. Drive circuit 3 drives zoom lens drive motor 4 to drive a zoom lens toward the wide angle end when it receives signal 181.

The operation of this embodiment will now be described. When the telephone side of zoom switch 1 is switched on, signal 102 from zoom switch 1 indicating that the telephoto side is selected is input to AND gates 15 and 16 and 17. When the scan range of image pickup device 11 is not minimum, a signal 213 obtained from inverter 510 and comprising an inverse of signal 212 from scan range detection circuit 21 is input to AND gate 16, so that scan range setting circuit 7 reduces the scan range of image pickup device 11 or drives same toward the telephoto end.

At this time, since signal 212 is not input to AND gate 17, AND gate 17 does not output signal 171 and zoom lens 4 is not operated (the scan range is maximum). Therefore, the zoom operation toward the telephoto end is performed only by reduction of the scan range of image pickup device 11.

When the scan range of image pickup device 11 is minimum or reaches the telephoto end, scan range detection circuit 21 outputs a signal 212, so that the output signal 161 from AND gate 16 is switched off. Therefore, the reduction of the scan range of image pickup device 11 or the change of the pickup device toward the telephoto end is stopped. If the telephoto side of zoom switch 1 is selected, signal 221 indicating that zoom lens 4 is not at the telephoto end is input to AND gate 17, so that the output signal 171 from AND gate 17 causes drive circuit 3 to drive zoom lens 4 toward the telephoto end. Namely, by driving zoom lens 4 toward the telephoto end with the scan range of image pickup device 11 being minimum or stopped at the telephoto end, the zoom operation toward the telephoto end further continues. When zoom lens 4 reaches the telephoto end, signal 221 from zoom position detector 22 is switched off and output signal 171 from AND gate 17 is also switched off to thereby stop the movement of the zoom lens by drive circuit 3 toward the telephoto end. Namely, the optical zoom operation is stopped.

It is to be noted that since output signal 171 from AND gate 17 is also switched off by switching off zoom switch 1, the operation of zoom lens 4 by drive circuit 3 is stopped.

When the wide side of zoom switch 1 is switched on, a signal 101 indicating that the wide angle side is selected is generated and input to AND gates 15 and 18. If zoom lens 4 is not at the wide angle end, the signal 222 from zoom position detector 22 is off. Therefore, the output signal 151 from AND gate 15 is off, scan range setting circuit 7 does not operate and the scan range of image pickup device 11 does not change. On the other hand, the output signal 222 is off, so that the signal 223 is input to AND gate 18, the output signal 181 of which is input to drive circuit 3 which controls zoom lens drive motor 4 so as to move a zoom lens toward the wide angle end. This causes the zoom operation toward the wide angle end to start optically before the scan range of image pickup device 11 is changed. So long as zoom switch 1 is not moved away from the wide angle side, zoom lens 4 is driven until it reaches the wide angle end.

When the signal from zoom lens 4 indicates that same is at the wide angle end, zoom position detector 22 produces a signal 222 to thereby switch off the output signal 181 from AND gate 18.

When the wide angle side of zoom switch 1 is on, a signal 211 from scan range detection circuit 21 indicating that the scan range of image pickup device 11 is maximum or does not reach the wide angle end, and signals 222, 101 are input to AND gate 15 which then produces an output signal 151 to scan range setting circuit 7 to enlarge the scan range of the image pickup device or change the scan range toward the wide angle end. When the scan range becomes maximum or reaches the wide angle end, the signal 211 from scan range detection circuit 21 is switched off, the output signal 151 from AND gate 15 is also switched off, and enlargement of the scan range of image pickup device 11 and hence the zoom operation toward the wide angle and are stopped. It is to be noted that when the wide angle side of zoom switch 1 is switched off, the zoom operation of the scan range of the image pickup device toward the wide angle end is also stopped.

Of course, when an electronic zoom operation is performed by changing the scan range of the image pickup device, scan rate control circuit 10 controls the scan rate so that the horizontal and vertical scanning periods are maintained constants, as in the first embodiment.

According to the electronic zoom including enlarging and reducing the scan range of the image pickup device in the above embodiment, to drive the electronic zoom toward the telephoto end is to reduce the scan range and there is no problem raised. However, it is impossible to perform the zoom operation toward the wide angle end after an image entering the image pickup device is set by an optical lens in advance. Namely, in an area which does not enter the image pickup device, it is impossible to input a correct image to the image pickup device even if the scan range of the input image device may be enlarged.

Figure 6:
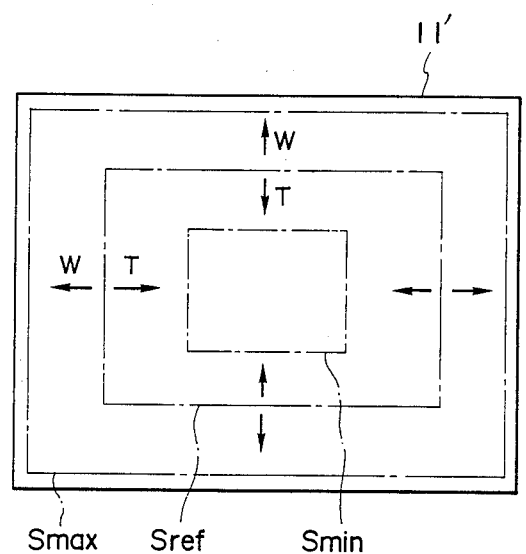
FIG. 6 illustrates the operation of an electronic zoom means of the present invention.

In order to solve this problem, for example as shown in FIG. 6, an image is set so that it enters the entire photoreceptor face 11' of the image pickup device, a normal or reference scan range is set beforehand, a maximum scan range Smax outside the reference range is set, and a minimum scan range Smin is set inside the reference range. According to this setting, a scannable area is assured even if the scan range is enlarged so as to perform the zoom operation toward the wide angle end, and correct zoom operation is possible.

Figure 3:
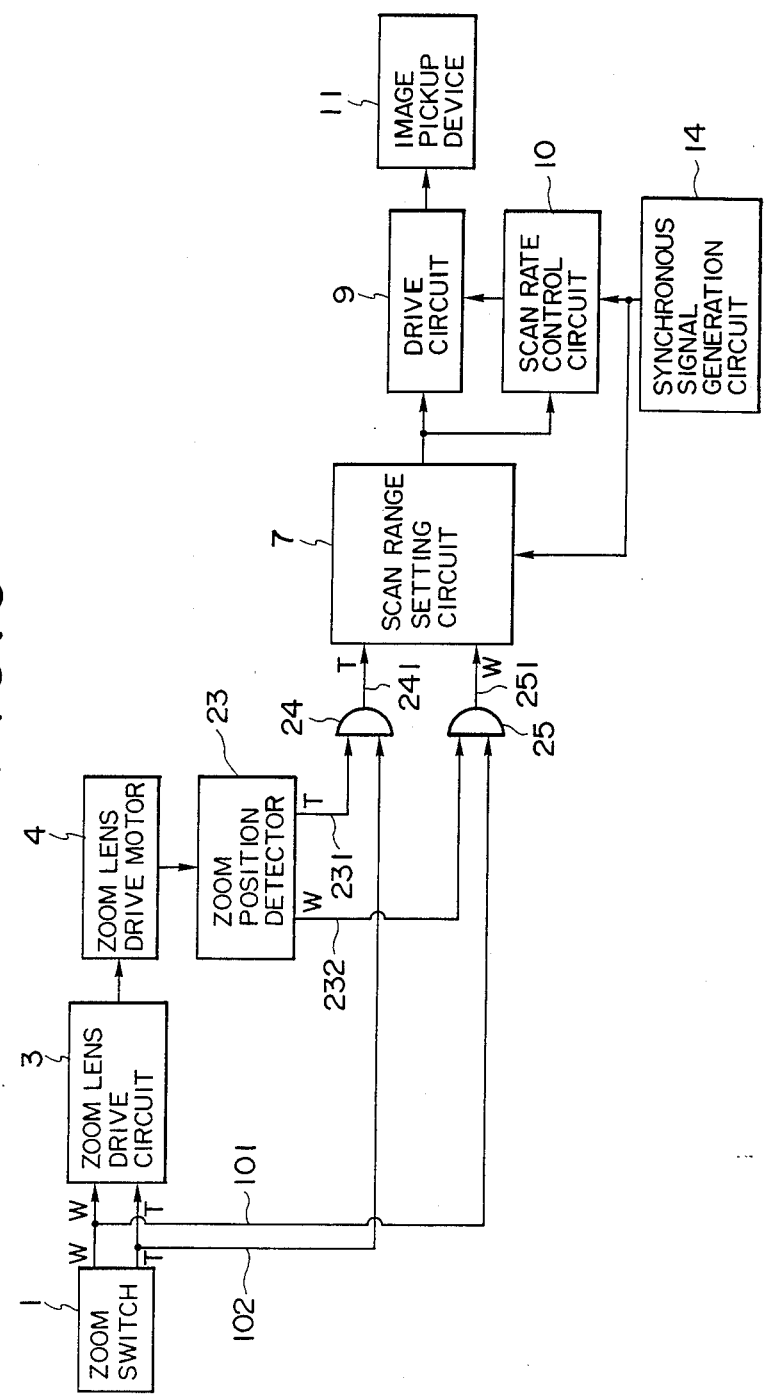
FIG. 3 is a block diagram showing the structure of a third embodiment of the present invention.

FIG. 3 is a block diagram showing a third embodiment of the present invention. This embodiment is different from the above embodiments which assign areas where the optical and electronic zoom operations are performed in the entire variable magnification range of the apparatus. According to this embodiment, when the zoom switch is operated, the scan range of the image pickup device 11 is enlarged or reduced after the zoom lens is driven to the telephoto end or the wide angle end, respectively.

In FIG. 3, the structural portions of this embodiment similar to the corresponding ones of the previous embodiments are similarly numbered and theirs description will be omitted.

Reference numeral 23 denotes a zoom position detector which detects the position of zoom lens 4 in movement and produces an output signal 231 when the zoom lens 4 has reached the telephoto end an an output signal 232 when zoom lens has reached the wide angle end.

Reference numeral 24 denotes an AND gate which outputs a signal 241 to scan range setting circuit 7 when it receives both of a signal 102 from zoom switch 1 indicating that the telephoto side is selected, and a signal 231 from zoom position detection circuit 23 indicating that zoom lens 4 has reached the telephoto end. Signal 241 causes scan range setting circuit 7 to reduce the scan range of image pickup device 11 or changes same toward the telephoto end.

Reference numeral 25 denotes an AND gate which outputs a signal 251 to scan range setting circuit 7 when it receives both of signal 101 from zoom switch 1 indicating that the wide angle side is selected, and signal 231 from zoom position detection circuit 23 indicating that the zoom lens 4 has reached the wide angle end. Signal 251 causes scan range setting circuit 7 to enlarge the scan range of image pickup device 11 or change same toward the wide angle end.

Other structural blocks of this embodiment are similar to the corresponding ones of the previous embodiments.

Therefore, when the telephoto side of zoom switch 1 is switched on, a signal 102 from switch 1 indicating that the telephoto side is selected is input to drive circuit 3 to drive zoom lens drive motor 4 so that a zoom lens is moved toward the telephoto end. At the same time the signal 102 is also supplied to AND gate 24, so that when zoom lens 4 reaches the telephoto end and zoom position detection circuit 23 produces signal 231, AND gate 24 produces an output signal 241 to scan range setting circuit 7. This causes the scan range of image pickup device 11 to be reduced and the electronic zoom operation is performed toward the telephoto end.

When the wide angle side of zoom switch 1 is switched on, a signal 101 from switch 1 indicating that the wide angle side is selected is input to drive circuit 3 to drive zoom lens 4 toward the wide angle end. At the same time, signal 101 is also supplied to AND gate 25, so that zoom lens 4 reaches the wide angle end and zoom position detection circuit 23 outputs a signal 232. This signal causes AND gate 25 to produce an output signal 251 to scan range setting circuit 7. This enlarges the scan range of image pickup device 11 and the electronic zooming operation is performed toward the wide angle end.

Of course, zoom lens 4 and scan range setting circuit 7 are stopped when they have reached the telephoto end or wide angle end, respectively.

Figure 4:
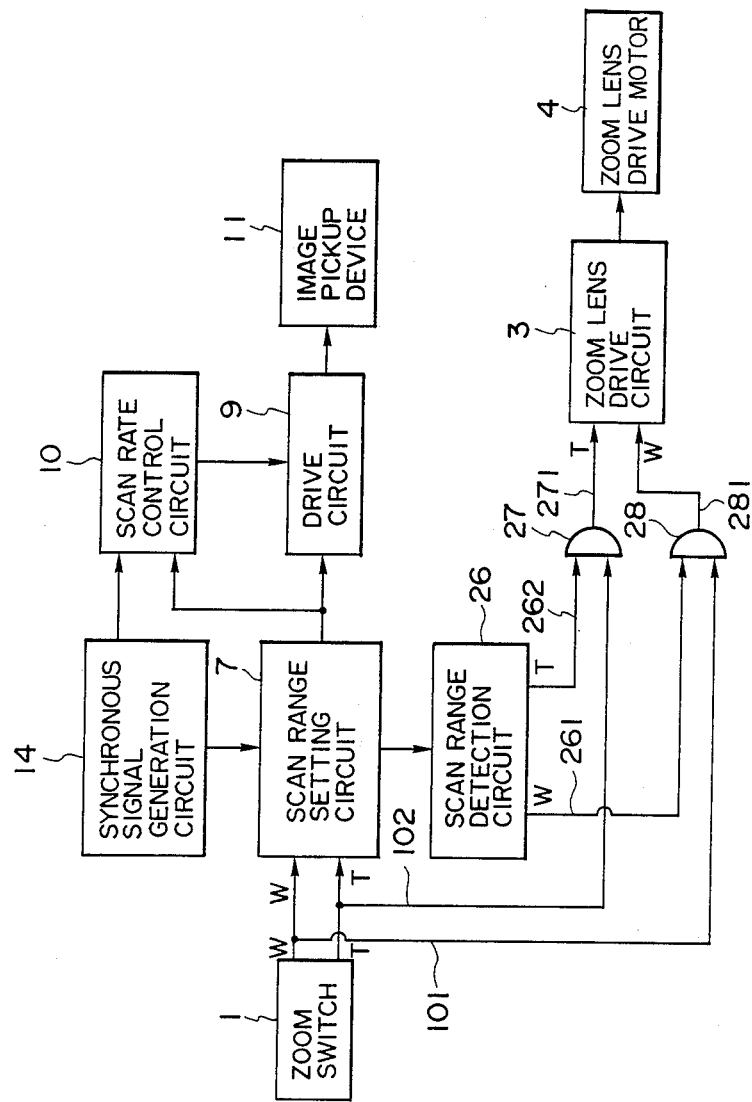
FIG. 4 is a block diagram showing the structure of a fourth embodiment of the present invention.

FIG. 4 is a block diagram showing a fourth embodiment of the present invention in which when the zoom switch is operated, the scan range of image pickup device 11 is enlarged or reduced to perform the electronic zoom operation, and then drive zoom lens 4 is driven.

In the same Figure, structural portions of this embodiment similar to the corresponding ones of the previous embodiments are similarly numbered and their description will be omitted.

Scan range detection circuit 26 receives information from scan range setting circuit 7 and outputs a signal 261 when the scan range of image pickup device 11 is maximum and a signal 262 when the scan range is minimum.

AND gate 27 outputs a signal 271 to drive circuit 3 when it receives both of signal 102 from zoom switch 1 indicating that the telephoto side is selected, and signal 262 from scan range detection circuit 26 indicating that the scan range of image pickup device 11 is minimum to thereby cause drive circuit 3 to drive zoom lens drive motor 4 so that a zoom lens is moved toward the telephoto end.

AND gate 28 produces an output signal 281 when it receives both of signal 101 from zoom switch 1 indicating that the wide angle side is selected, and a signal 261 from scan range detection circuit 26 indicating that the scan range of image pickup device 11 is maximum to thereby causes drive circuit 3 to drive zoom lens drive motor 4 so that a zoom lens is moved toward the wide angle end.

Other structural blocks of this embodiment are similar to the corresponding ones of the previous embodiments.

Therefore, when the telephoto side of zoom switch 1 is switched on, signal 102 from switch 1 indicating that the telephoto side is selected is input to scan range setting circuit 7, so that the scan range of image pickup device 11 is reduced or changed toward the telephoto end. At the same time, signal 102 is also supplied to AND gate 27, so that when the scan range of image pickup device 11 becomes minimum and scan range detection circuit 26 outputs a signal 262 to drive circuit 3, zoom lens 4 starts to be driven toward the telephoto end.

When the wide angle side of zoom switch 1 is switched on, a signal 101 from switch 1 indicating that the wide angle side is selected is input to scan range setting circuit 7 to enlarge the scan range of image pickup device 11 or change the scan range toward the wide angle end. At the same time, signal 101 is also supplied to AND gate 28, so that when the scan range of image pickup device 11 becomes maximum and scan range detection circuit 26 outputs a signal 261 to drive circuit 3, zoom lens 4 starts to be driven toward the wide angle end.

Also in this embodiment, zoom lens 4 and scan range setting circuit 7 are stopped when they reach the telephoto end or the wide angle end, respectively.

In order to drive the image pickup device toward the wide angle end after the input image is set by the zoom lens, it is required to set a reference scan range Sref in advance and a maximum scan range Smax outside the reference range, as shown in FIG. 6 and as mentioned above, which allows the electronic zoom operation to be performed without any problem being raised.

Figure 5:
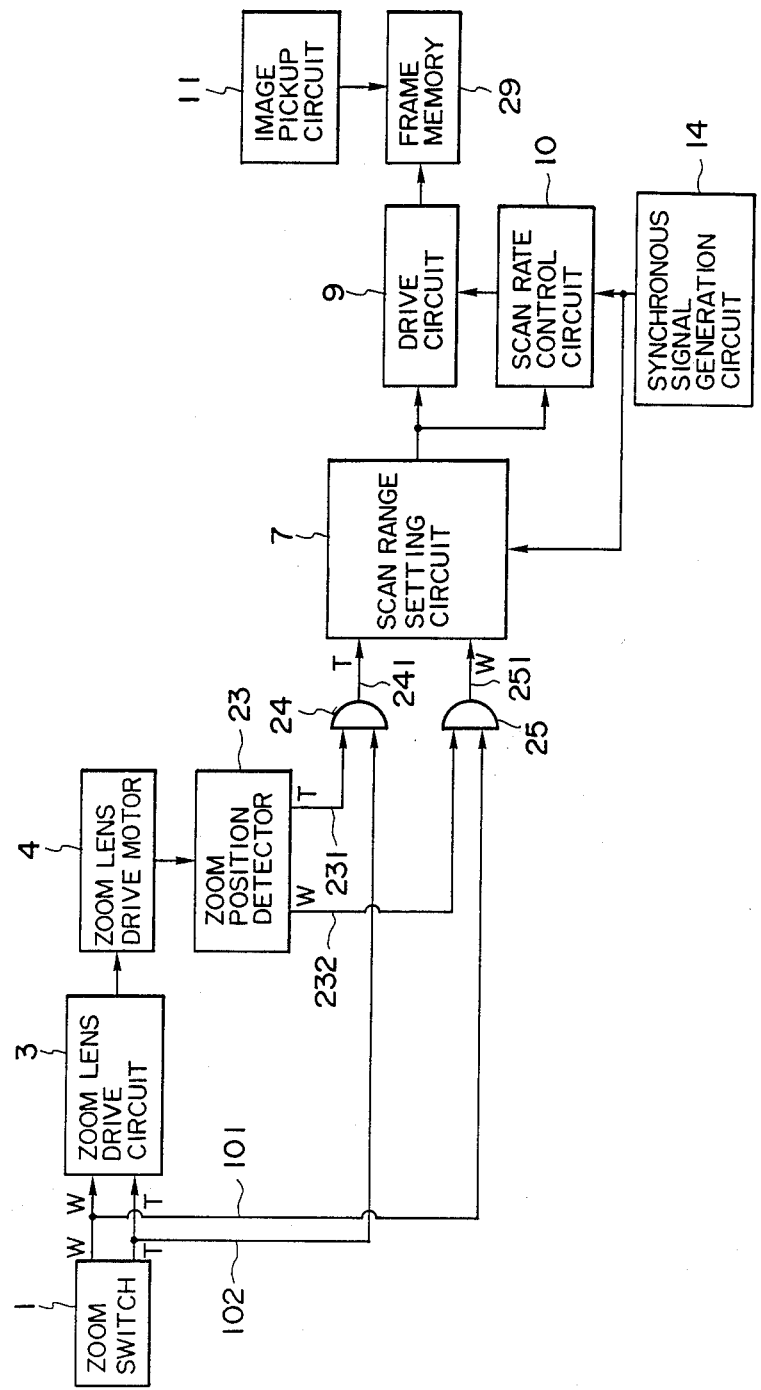
FIG. 5 is a block diagram showing the structure of a fifth embodiment of the present invention.

While in the above respective embodiments, a change of the scan range of image pickup device 11 has been described as being performed by changing the scan range of the image pickup device itself. However, the invention is not restricted to this. A similar effect may be obtained, for example, as shown in FIG. 5, by reading signals from the entire face of image pickup device 11, storing these signals temporally in a frame memory (or field memory) 29 and reading the stored image signals sequentially at the timing of scan signals generated by scan rate control circuit 10 in accordance with a scan range designated by scan range setting circuit 7.

Other structural portions and operations of this embodiment are similar to the corresponding ones of the third embodiment shown in FIG. 3 and their detailed description will be omitted. The basis circuit structure of FIG. 5 is applicable to any previous embodiments except for the embodiment of FIG. 3.

Also in this embodiment, which temporally stores in frame memory 29 signals read from image pickup device 11, a problem, such as mentioned above, which would otherwise occur when the electronic zoom is performed toward the wide angle end, could be solved by setting the scan range of frame memory 29 so as to satisfy a relationship such as the relationship among reference scan range Sraf, maximum scan range Smax and minimum scan range Smin, shown in FIG. 6.

As described above, according to the invention, many changes and modifications are possible in accordance with applications by combinations of changing optical and electronic zooms.

What is claimed is:

1. An image pickup apparatus comprising:
   (a) image pickup means for pickup up the image of a subject, said image pickup means having a surface;
   (b) a zoom lens for changing a magnification of the image of the subject picked up by said image pickup means; and
   (c) range changing means for changing a readout range of said surface of said image pickup means substantially at the time the image is picked up by said image pickup means; and
   control means for controlling the operation of both said zoom lens and said range changing means to enlarge or reduce an image signal in accordance with a predetermined algorithm.

2. An image pickup apparatus according to claim 1, wherein said image pickup means is a Charge Coupled Device:

3. An image pickup apparatus according to claim 1, wherein:
   said control means includes means for operating said zoom lens and said scan range changing means individually.

4. An image pickup apparatus according to claim 1, wherein:
   said control means includes means for manual operation.

5. An image pickup apparatus according to claim 1, further including:
   detection means for detecting the operation of said zoom lens and said range changing means.

6. An image pickup apparatus according to claim 5, wherein:
   said control means includes means for controlling said zoom lens and said range changing means in accordance with an output from said detection means.

7. An image pickup apparatus according to claim 1, wherein:
   said zoom lens includes a first variable magnification range, and said range changing means includes a second variable magnification range, said ranges being respectively assigned to predetermined portions of an entire variable magnification range of the image pickup apparatus.

8. An image pickup apparatus according to claim 1, wherein:
   said control means includes means for operating either one of said zoom lens and said range changing means first and then operating the other.

9. An image pickup apparatus according to claim 8, wherein:
   said control means includes means for operating either one of said zoom lens and said range changing means after the other has reached an end of its variable magnification range.

10. An image pickup apparatus according to claim 7, wherein said control means includes means for operating either one of said zoom lens and said scan range changing means first, and then operating the other.

11. An image pickup apparatus according to claim 10, wherein:
    said control means includes means for operating either one of said zoom lens and said range changing means after the other has reached an end of its variable magnification range.

12. An image pickup apparatus according to claim 1, wherein:
    said image pickup means includes an image pickup device, and wherein said range changing means changes the scan range of said image pickup device.

13. An image pickup apparatus according to claim 1, wherein:
    said image pickup means includes a frame memory or a field memory for storing image signals, and wherein said range changing means changes a read range of said frame memory or said field memory.

14. An image pickup apparatus according to claim 1, further including:
    scan rate control means operative to maintain a period of scan across said image pickup means surface when the range is changed by said range changing means.

15. An image pickup apparatus comprising:
(a) image pickup means for picking up an image of a subject;
(b) optical zoom means for changing a magnification of the image of the subject picked up by said image pickup means;
(c) electronic zoom means for enlarging or reducing an image signal output from said image pickup means; and
(d) control means for controlling the operation of both said optical zoom means and said electronic zoom means, said control means automatically controlling both said optical zoom means and said electronic zoom means according to a zoom state of each of said optical and electronic zoom means.

16. An image pickup apparatus according to claim 15, wherein:
said control means includes means for controlling the operation of said optical zoom means and said electronic zoom means in accordance with a predetermined algorithm.

17. An image pickup apparatus according to claim 15, wherein:
said control means includes means for operating said optical zoom means and said electronic zoom means individually.

18. An image pickup apparatus according to claim 15, wherein:
said control means includes means for manual operation.

19. An image pickup apparatus of claim 15, further including:
detection means for detecting the operation of said optical zoom means and said electronic zoom means.

20. An image pickup apparatus according to claim 19, wherein:
said control means includes means for controlling each of said zoom means on the basis of an output from said detection means.

21. An image pickup apparatus according to claim 15, wherein:
said optical zoom means has a first variable magnification range and said electronic zoom means has a second variable magnification range, which ranges are assigned to predetermined portions of an entire variable magnification range of said image pickup apparatus.

22. An image pickup apparatus according to claim 15, wherein:
said control means includes means for operating either one of said optical zoom means and said electronic zoom means first and then operating the other.

23. An image pickup apparatus according to claim 22, wherein:
said control means includes means for operating either one of said optical zoom means and said electronic zoom means after the other has reached an end of its variable magnification range.

24. An image pickup apparatus according to claim 21, wherein:
said control means includes means for operating either one of said optical zoom means and said electronic zoom means first and then operating the other.

25. An image pickup apparatus according to claim 24, wherein:
said control means includes means for operating either one of said optical zoom means and said electronic zoom means after the other has reached an end of its variable magnification range.

26. An image pickup apparatus according to claim 15, wherein:
said image pickup means includes an image pickup device, and wherein said electronic zoom means changes a scan range of said image pickup device.

27. An image pickup apparatus according to claim 15, wherein:
said image pickup means includes a frame memory or a field memory for storing image signals, and wherein said electronic zoom means changes a read range of said frame memory or said field memory.

28. An image pickup apparatus according to claim 15, further including:
scan rate control means for maintaining a scan synchronization constant when a scan range of said image pickup means is changed by said electronic zoom means.

29. An electronic camera comprising:
(a) image pickup means for picking up up an image of a subject, said image pickup means having a surface;
(b) first means for changing a size of the image formed on said surface of said image pickup means;
(c) second means for changing an image pickup range of said surface by restricting an image signal output from said image pickup means;
(d) detection means for detecting an operation state of each of said first and second means; and
(e) control means for continuously controlling said first and second means according to an output of said detection means.

30. An electronic camera according to claim 29, wherein said first means is a means for optically changing a magnification, and wherein said second means is a means for electrically changing a readout range of said image pickup means.

31. An electronic camera according to claim 29, wherein said control means includes means for manual operation.

32. An electronic camera according to claim 31, wherein said first means has a first variable magnification range, and wherein said second means has a second variable magnification range, which ranges are assigned to predetermined portions of an entire variable magnification range of said image pickup apparatus.

33. An electronic camera according to claim 30, wherein said control means includes means for operating either one of said first means and said second means, and then operating the other.

34. An electronic camera according to claim 33, wherein said control means includes means for operating either one of said first means and said second means after the other has reached an end of its variable magnification range.

35. An electronic camera according to claim 30, wherein said image pickup means is a Charge Coupled Device.

36. An electronic camera according to claim 29, wherein said image pickup means includes a frame memory or a field memory for storing image signals, and wherein said second means changes a read range of said frame memory or said field memory.

37. An electronic camera according to claim 29, wherein said second means changes a scan range of said image pickup means, and further comprising scan rate control means for maintaining a scan synchronization constant when the scan range of said image pickup means is changed.

* * * * *

UNITED STATES PATENT AND TRADEMARK OFFICE
CERTIFICATE OF CORRECTION

PATENT NO. : 4,843,475  Page 1 of 2

DATED : June 27, 1989

INVENTOR(S) : Imai

It is certified that error appears in the above-identified patent and that said Letters Patent is hereby corrected as shown below: On the title page:

RELATED U.S. APPLICATION DATA [63]:

Change "Continuation of Ser. No. 821,354, March 3, 1987, aban-/doned." to --Continuation of Ser. No. 021,354, March 3, 1987, abandoned.--.

AT [57] IN THE ABSTRACT:

Line 3, change "of" to --for-- and change "for" to --of--.

COLUMN 1

Line 12, delete "the" (second occurrence).
Line 13, delete "end".

COLUMN 3

Line 53, change "output signal 172" to --output signal 171--.

COLUMN 6

Line 62, change "and" to --end--.

COLUMN 7

Line 38, change "theirs" to --their--.

COLUMN 9

Line 38, change "basis" to --basic--.

UNITED STATES PATENT AND TRADEMARK OFFICE
CERTIFICATE OF CORRECTION

PATENT NO. : 4,843,475

DATED : June 27, 1989

INVENTOR(S) : Imai

It is certified that error appears in the above-identified patent and that said Letters Patent is hereby corrected as shown below:

<u>COLUMN 10</u>
   Line 3, change "Device:" to --Device.--.

<u>COLUMN 12</u>
   Line 20, change "up up" to --up--.

Signed and Sealed this

Third Day of July, 1990

*Attest:*

HARRY F. MANBECK, JR.

*Attesting Officer*     Commissioner of Patents and Trademarks